US012756127B2

(12) United States Patent
Kameyama et al.

(10) Patent No.: US 12,756,127 B2
(45) Date of Patent: Oct. 6, 2026

(54) CONNECTOR INCLUDING DEFORMABLE SPACER WITH TERMINAL LOCKING PORTION

(71) Applicant: YAZAKI CORPORATION, Tokyo (JP)

(72) Inventors: Isao Kameyama, Makinohara (JP); Atsuhito Saito, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 330 days.

(21) Appl. No.: 18/752,772

(22) Filed: Jun. 24, 2024

(65) Prior Publication Data

US 2025/0023283 A1 Jan. 16, 2025

(30) Foreign Application Priority Data

Jul. 10, 2023 (JP) ................................ 2023-112757

(51) Int. Cl.
*H01R 13/436* (2006.01)

(52) U.S. Cl.
CPC ................................ *H01R 13/4362* (2013.01)

(58) Field of Classification Search
CPC .......................... H01R 13/4362; H01R 13/506
See application file for complete search history.

(56) References Cited

FOREIGN PATENT DOCUMENTS

| | | | | | |
|---|---|---|---|---|---|
| CN | 101861682 | A | * | 10/2010 | H01R 13/4361 |
| CN | 112600014 | A | * | 4/2021 | H01R 13/502 |
| JP | H11-162547 | A | | 6/1999 | |
| JP | 2002-184519 | A | | 6/2002 | |
| JP | 2009-043519 | A | | 2/2009 | |
| JP | 2014-207101 | A | | 10/2014 | |
| KR | 2021156755 | A | * | 12/2021 | |
| WO | WO-2019045038 | A1 | * | 3/2019 | H01R 13/641 |

* cited by examiner

*Primary Examiner* — Travis S Chambers
(74) *Attorney, Agent, or Firm* — KENEALY VAIDYA LLP

(57) ABSTRACT

A connector includes a terminal-equipped electric wire, a housing, and a spacer. The spacer includes: a main wall body deformable in a bendable manner; an auxiliary wall body deformable in a bendable manner, and forms a boundary portion with the main wall body along an insertion/removal direction of the terminal-equipped electric wire; a terminal locking portion that protrudes from an inner wall surface of each of the main wall body and the auxiliary wall body at one end of the boundary portion, and locks a terminal fitting at a main locking position to hold the terminal-equipped electric wire at a housing completion position; and a housing locked portion that protrudes from the other end side of the inner wall surface of the auxiliary wall body. The housing includes a spacer holding portion that maintains the locked state of the housing locked portion to the main locking portion.

6 Claims, 6 Drawing Sheets

CONNECTOR INCLUDING DEFORMABLE SPACER WITH TERMINAL LOCKING PORTION

CROSS-REFERENCE TO RELATED APPLICATION(S)

The present application claims priority to and incorporates by reference the entire contents of Japanese Patent Application No. 2023-112757 filed in Japan on Jul. 10, 2023.

BACKGROUND OF THE INVENTION

1. Field of the Invention

The present invention relates to a connector.

2. Description of the Related Art

Conventionally, it has been known that a connector includes a spacer that enables a terminal-equipped electric wire to be inserted into and removed from a housing chamber at a temporary locking position with respect to a housing body, and holds the terminal-equipped electric wire having entered a housing completion position at a main locking position with respect to the housing body. The spacer has cantilevered flexible piece portions arranged to face each other with a space therebetween, and a locking claw to be locked to the housing body at the temporary locking position and at the main locking position is provided on an inner wall at a free end of each of the flexible piece portions. Then, when the locking claw climbs over a temporary locking claw and a main locking claw of the housing body, the spacer reaches the main locking position while the pair of flexible piece portions are bent in an opening direction in which the distance between the pair of flexible piece portions increases and are returned to the original state. The spacer locks a terminal fitting at the main locking position with terminal locking portions connected to the pair of flexible piece portions to stop the terminal-equipped electric wire at the housing completion position. This type of connector is disclosed in, for example, Japanese Patent Application Laid-open No. 2014-207101 A.

In the conventional spacer, when the pair of flexible piece portions are bent in the opening direction due to a force that the terminal locking portions have received from the terminal fitting at the main locking position, the locking claw may be separated from the main locking claw and may not stop at the main locking position, and as a result, the terminal-equipped electric wire may come out of the housing chamber. Therefore, the conventional spacer is formed in a hardly deformed shape with high rigidity so as not to bend the pair of flexible piece portions in the opening direction even if the terminal locking portions receive a force from the terminal fitting at the main locking position. Therefore, concerning the conventional connector, there is concern that the increase in rigidity of the spacer causes an increase in size, resulting in an increase in overall size.

SUMMARY OF THE INVENTION

At this point, an object of the present invention is to provide a connector capable of securing a terminal holding force while suppressing an increase in size.

In order to achieve the above mentioned object, a connector according to one aspect of the present invention includes a terminal-equipped electric wire in which a terminal fitting is physically and electrically connected to a terminal of an electric wire; a housing that houses the terminal of the electric wire and the terminal fitting at a housing completion position in a housing chamber of a housing body, and pulls out the electric wire from an electric wire outlet of the housing body to an outside; and a spacer that enables the terminal-equipped electric wire to be inserted into and removed from the housing chamber at a temporary locking position of the housing, and holds the terminal-equipped electric wire having entered the housing completion position at a main locking position of the housing, wherein the spacer includes: a plate-shaped main wall body that is deformable in such a manner as to be bendable in a plate thickness direction, and has an inner wall surface disposed to face the housing body; a plate-shaped auxiliary wall body that is deformable in such a manner as to be bendable in a plate thickness direction, is suspended from the main wall body, has an inner wall surface disposed to face the housing body, and forms a boundary portion with the main wall body along an insertion/removal direction of the terminal-equipped electric wire; a terminal locking portion that protrudes from the inner wall surface of each of the main wall body and the auxiliary wall body at one end of the boundary portion in the insertion/removal direction, and locks a movement of the terminal fitting toward the electric wire outlet at the main locking position to hold the terminal-equipped electric wire at the housing completion position; and a housing locked portion that protrudes from the other end side of the inner wall surface of the auxiliary wall body in the insertion/removal direction rather than the terminal locking portion, is locked to a temporary locking portion of the housing at the temporary locking position, and is locked to a main locking portion of the housing at the main locking position, and the housing includes a spacer holding portion that maintains the locked state of the housing locked portion with respect to the main locking portion by locking a retainer locking portion at one end of the auxiliary wall body in the insertion/removal direction, when a force for pulling away the auxiliary wall body from the housing body acts due to a force that the terminal locking portion has received from the terminal fitting in the spacer at the main locking position.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
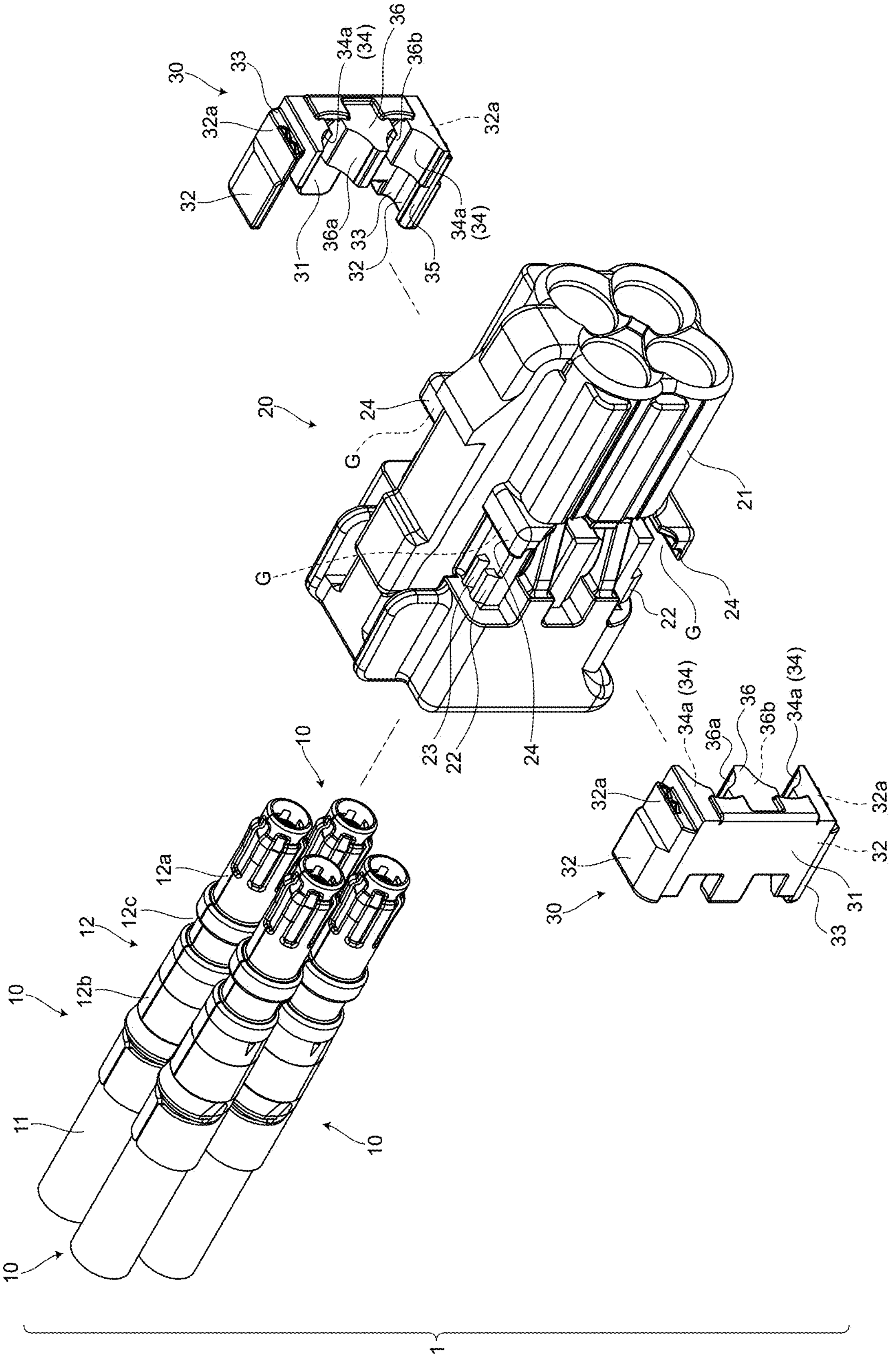
FIG. 1 is an exploded perspective view illustrating a connector according to an embodiment.
Figure 2:
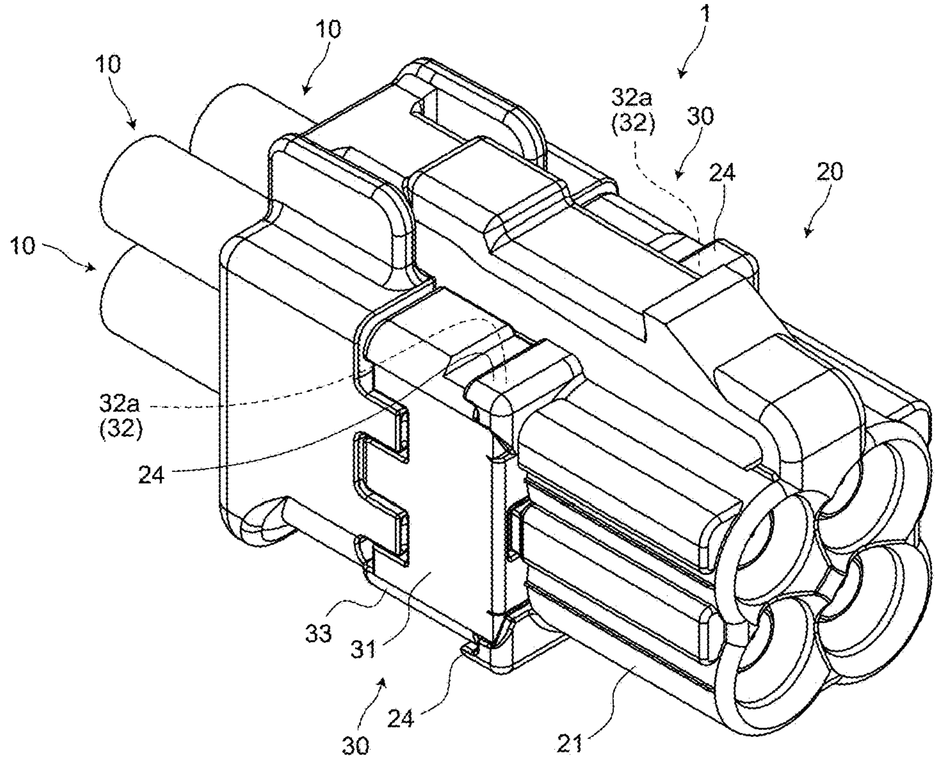
FIG. 2 is a perspective view illustrating the connector according to the embodiment in a state where a spacer is located at a main locking position.
Figure 3:
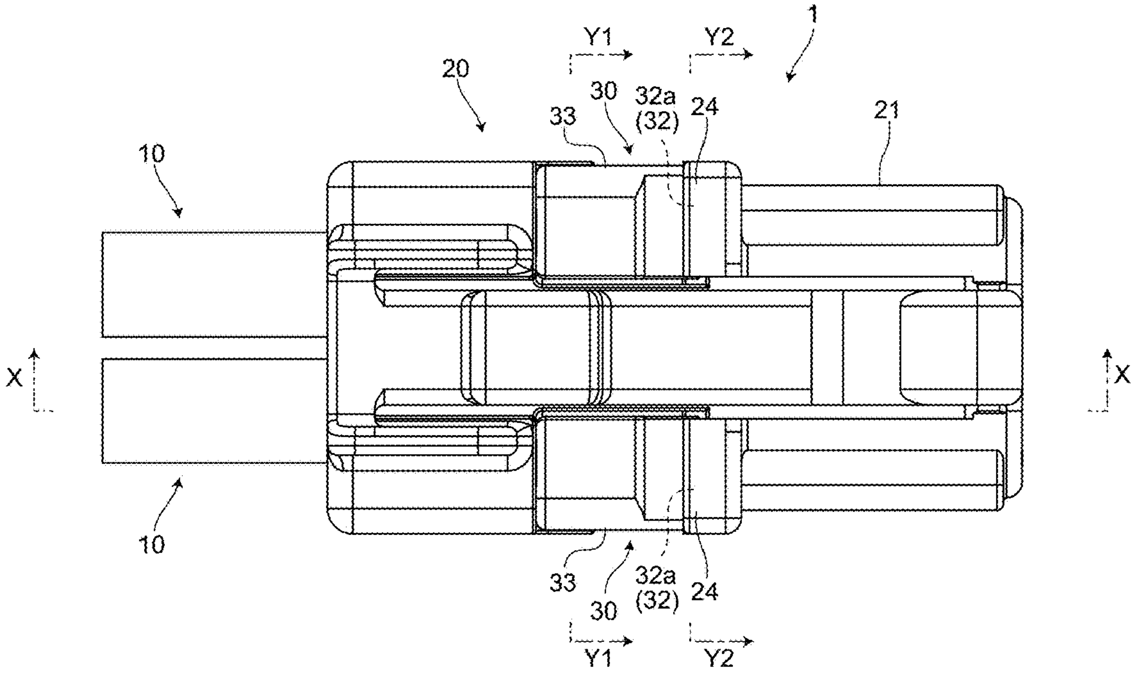
FIG. 3 is a plan view illustrating the connector according to the embodiment in a state where the spacer is located at the main locking position.

Hereinafter, an embodiment of a connector according to the present invention will be described in detail with reference to the drawings. Note that the present invention is not limited by the embodiment.

EMBODIMENT

One embodiment of a connector according to the present invention will be described with reference to FIGS. 1 to 10.

Reference numeral 1 used in FIGS. 1 to 10 denotes a connector according to the present embodiment. The connector 1 includes a terminal-equipped electric wire 10, a housing 20 that houses the terminal-equipped electric wire 10 at a housing completion position, and a spacer 30 that holds the terminal-equipped electric wire 10 at the housing completion position (FIGS. 1 to 10).

Figure 4:
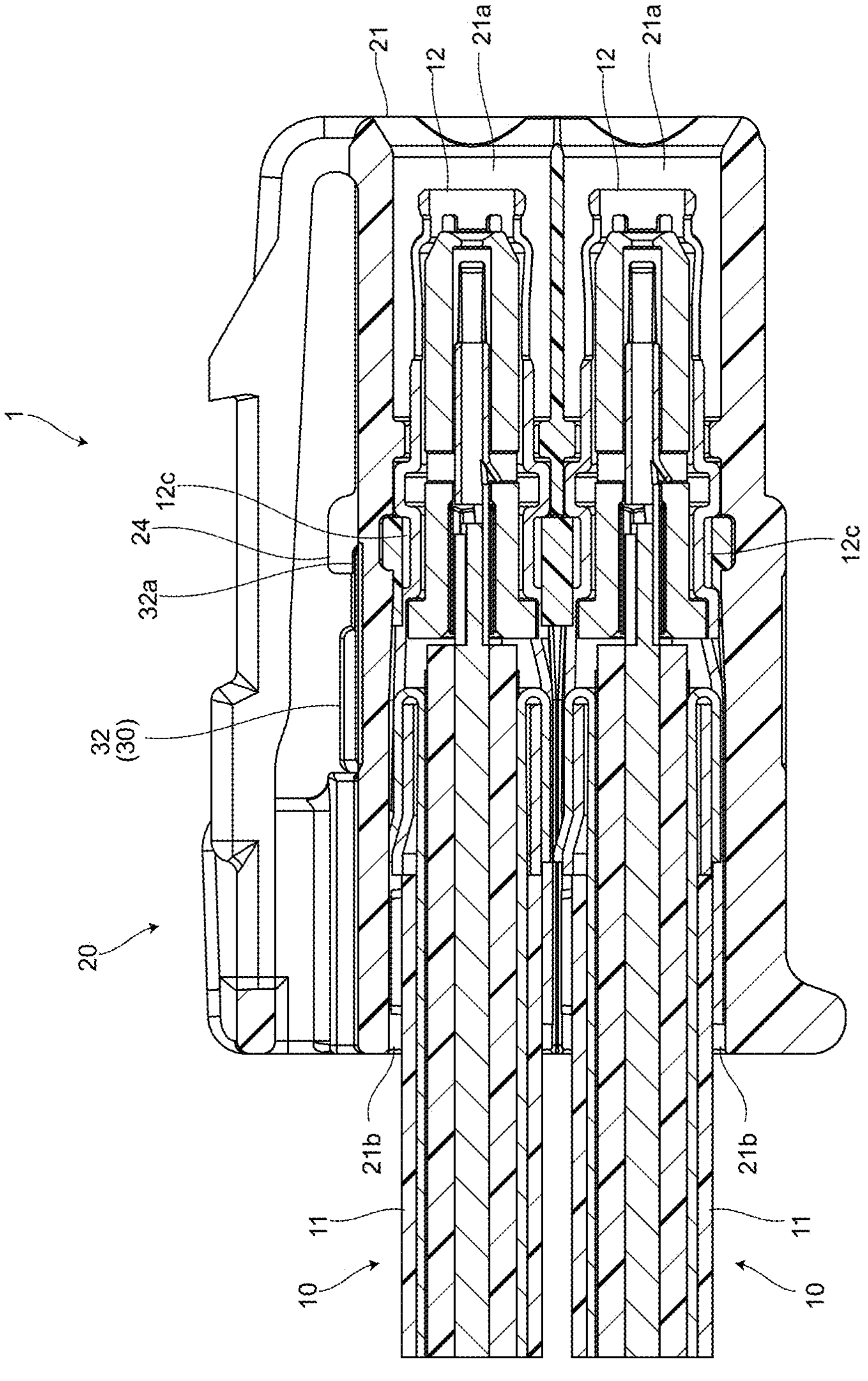
FIG. 4 is a cross-sectional view taken along line X-X of FIG. 3.

The terminal-equipped electric wire 10 includes an electric wire 11 and a terminal fitting 12 physically and electrically connected to a terminal of the electric wire 11 (FIGS. 1 and 4).

The terminal fitting 12 is formed of a conductive material such as metal. The terminal fitting 12 includes a terminal connecting portion 12*a* physically and electrically connected to a counterpart terminal fitting and an electric wire connecting portion 12*b* physically and electrically connected to the terminal of the electric wire 11 (FIG. 1). In the terminal fitting 12, the terminal connecting portion 12*a* and the electric wire connecting portion 12*b* are aligned on a straight line, and the direction in which the terminal connecting portion 12*a* and the electric wire connecting portion 12*b* are arranged is defined as an insertion/removal direction with respect to the counterpart terminal fitting. The terminal connecting portion 12*a* is formed in the shape of a male or female terminal. The terminal connecting portion 12*a* illustrated here is formed in the shape of a female terminal having a cylindrical outer circumferential wall, and a shaft-shaped counterpart terminal fitting is fitted and connected along a cylinder axial direction thereof.

The housing 20 is formed of an insulating material such as a synthetic resin. The housing 20 includes a housing body 21 that houses the terminal-equipped electric wire 10 at the housing completion position (FIGS. 1 to 10). In the housing body 21, a housing chamber 21*a* that houses the terminal of the electric wire 11 and the terminal fitting 12 at the housing completion position, and an electric wire outlet 21*b* from which the electric wire 11 is pulled out are formed (FIG. 4). In the housing body 21 illustrated here, four pairs each being formed by the housing chamber 21*a* and the electric wire outlet 21*b* are arranged in a lattice shape, and one terminal-equipped electric wire 10 is accommodated in each of the housing chambers 21*a*.

The spacer 30 is formed of an insulating material such as a synthetic resin. The spacer 30 is locked to the housing 20 at a temporary locking position and at a main locking position. The spacer 30 enables the terminal-equipped electric wire 10 to be inserted into and removed from the housing chamber 21*a* at the temporary locking position, and holds the terminal-equipped electric wire 10 having entered the housing completion position at the main locking position. FIGS. 2 to 6 illustrate a state in which the spacer 30 is assembled to the housing 20 at the main locking position. FIGS. 7 to 10 illustrate a state in which the spacer 30 is assembled to the housing 20 at the temporary locking position.

Specifically, the spacer 30 includes a plate-shaped main wall body 31 that is deformable in such a manner as to be bendable in a plate thickness direction and has an inner wall surface disposed to face the housing body 21, and a plate-shaped auxiliary wall body 32 that is deformable in such a manner as to be bendable in a plate thickness direction, is suspended from the main wall body 31, and has an inner wall surface disposed to face the housing body 21 (FIGS. 1 to 3 and 5 to 10). The auxiliary wall body 32 has a fixed end adjoining the main wall body 31 and a free end that is a distal end in a suspended direction. The auxiliary wall body 32 forms a boundary portion 33 with the main wall body 31 along the insertion/removal direction of the terminal-equipped electric wire 10 (FIGS. 1 to 3 and FIGS. 5 to 10). In the auxiliary wall body 32, the free end is also formed along the insertion/removal direction of the terminal-equipped electric wire 10. Note, in the following description, when the "insertion/removal direction" is simply written, it refers to the insertion/removal direction of the terminal-equipped electric wire 10.

Figure 6:
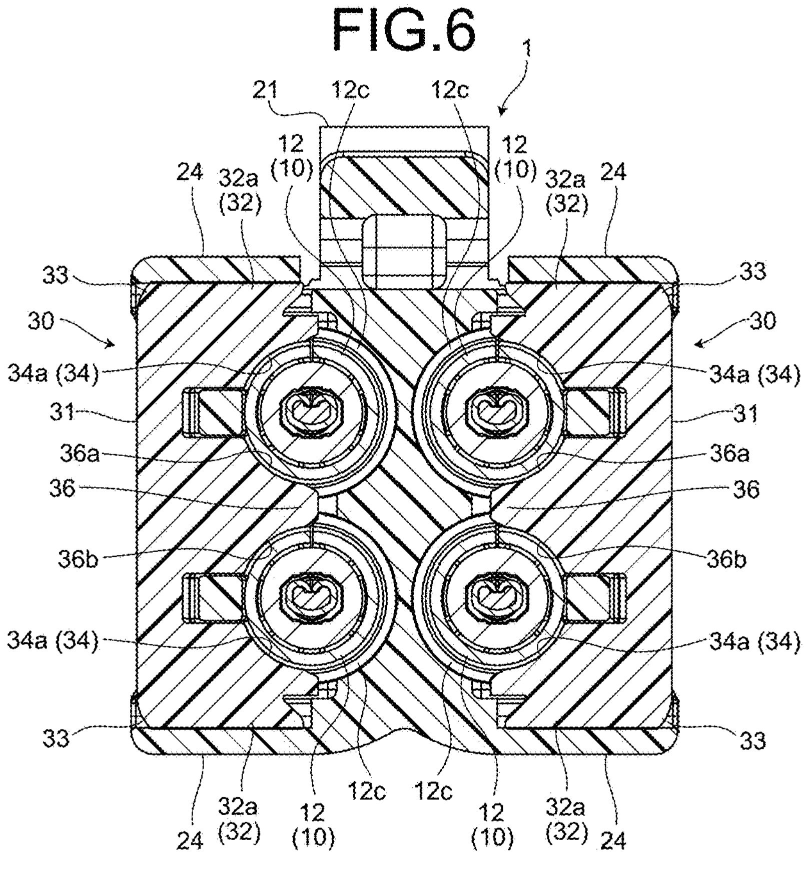
FIG. 6 is a view obtained by rotating a cross section taken along line Y2-Y2 of FIG. 3 by 90 degrees.
Figure 7:
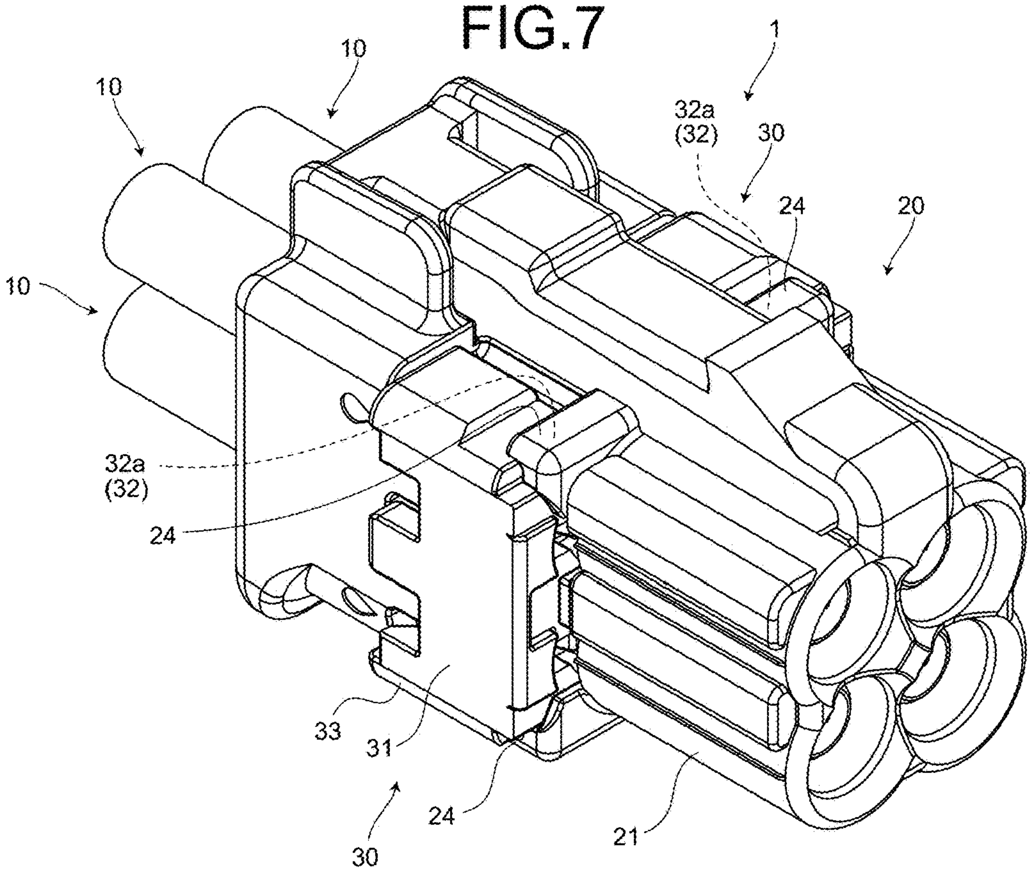
FIG. 7 is a perspective view illustrating the connector according to the embodiment in a state where the spacer is located at a temporary locking position.
Figure 8:
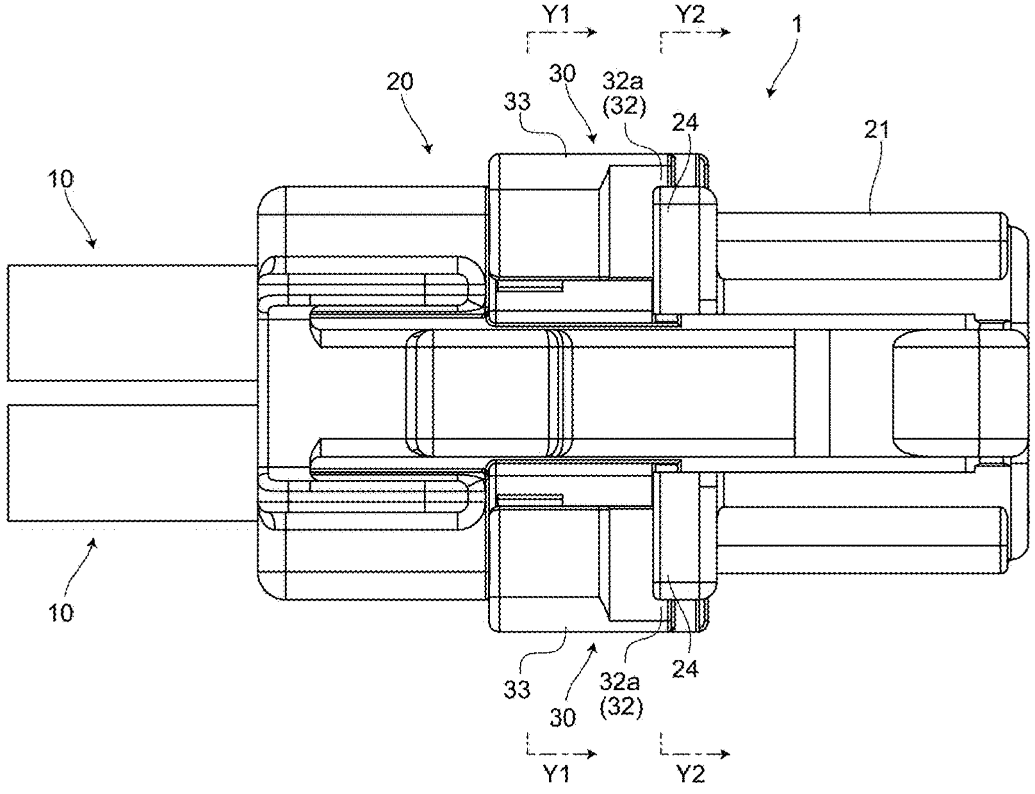
FIG. 8 is a plan view illustrating the connector according to the embodiment in a state where the spacer is located at the temporary locking position.
Figure 10:
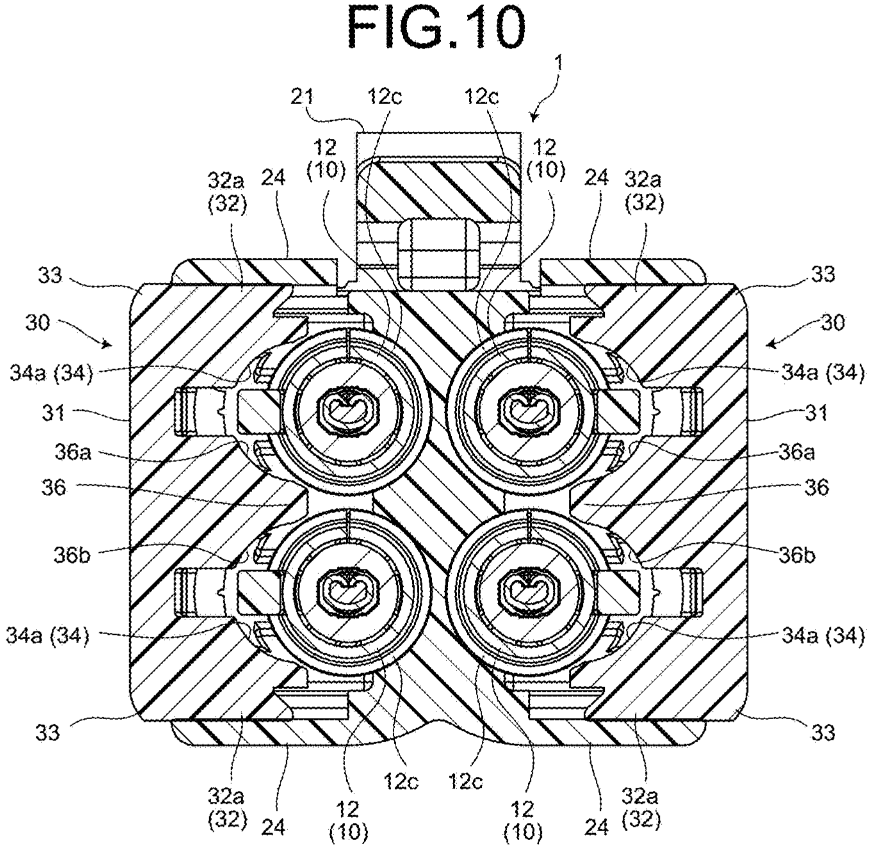
FIG. 10 is a view obtained by rotating a cross section taken along line Y2-Y2 of FIG. 8 by 90 degrees.

In addition, the spacer 30 has a terminal locking portion 34 that locks a movement of the terminal fitting 12 toward the electric wire outlet 21*b* at the main locking position and holds the terminal-equipped electric wire 10 at the housing completion position (FIGS. 1, 6, and 10). The terminal locking portion 34 protrudes from the inner wall surface of each of the main wall body 31 and the auxiliary wall body 32 at one end in the insertion/removal direction of the boundary portion 33. The terminal locking portion 34 illustrated here extends from the fixed end adjoining the boundary portion 33 to the free end of the auxiliary wall body 32, and has a wall surface 34*a* formed in the protruding direction as an arc-shaped wall surface (FIGS. 1, 6, and 10). In the terminal connecting portion 12*a* illustrated here, a concentric annular fitting groove 12*c* into which the terminal locking portion 34 is fitted at the main locking position is formed in the outer circumferential wall of the cylinder (FIGS. 1, 4, 6, and 10). The arc-shaped wall surface 34*a* of the terminal locking portion 34 is disposed to face the groove bottom of the fitting groove 12*c*. In the terminal fitting 12, the terminal locking portion 34 is fitted into the fitting groove 12*c*, thereby locking a movement of the terminal connecting portion 12*a* in the cylinder axis direction to the terminal locking portion 34.

Figure 5:
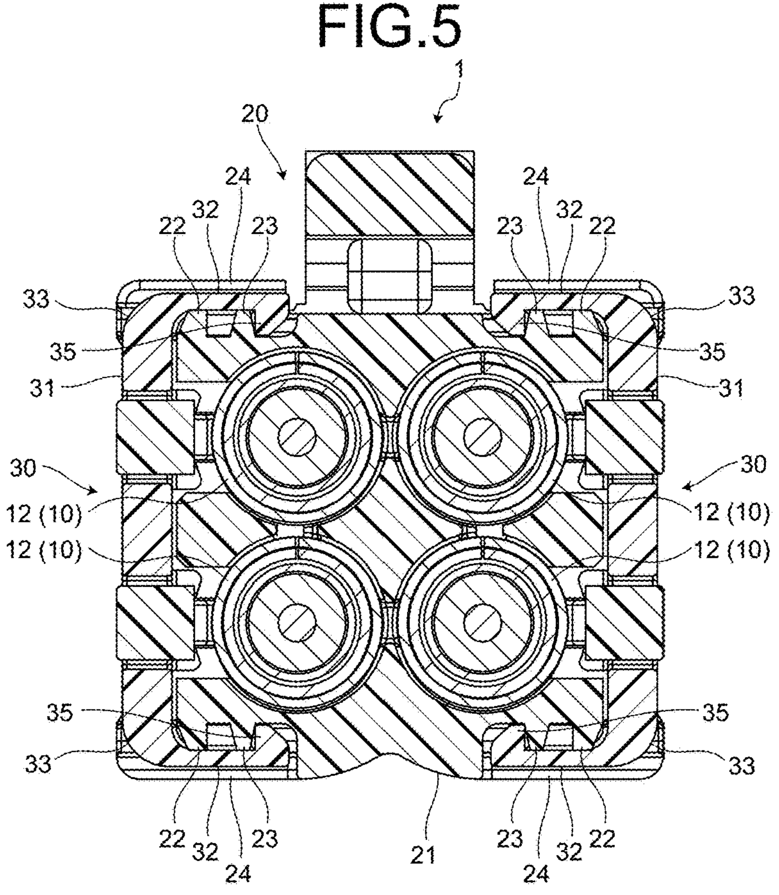
FIG. 5 is a view obtained by rotating a cross section taken along line Y1-Y1 of FIG. 3 by 90 degrees.
Figure 9:
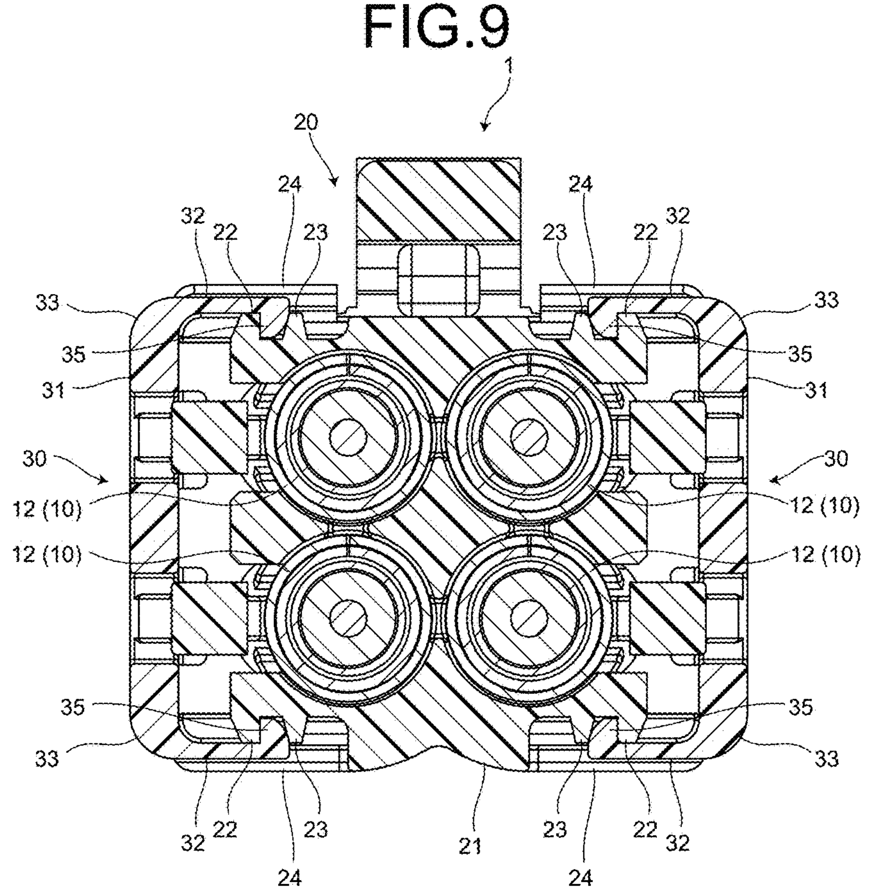
FIG. 9 is a view obtained by rotating a cross section taken along line Y1-Y1 of FIG. 8 by 90 degrees.

In addition, the spacer 30 has a housing locked portion 35 that is locked to a temporary locking portion 22 of the housing 20 at the temporary locking position and locked to a main locking portion 23 of the housing 20 at the main locking position (FIGS. 1, 5, and 9). The housing locked portion 35 is formed in the shape of a claw protruding from the other end side of the inner wall surface of the auxiliary wall body 32 in the insertion/removal direction rather than the terminal locking portion 34. The housing locked portion 35 illustrated here protrudes from the free end on the other end side of the inner wall surface of the auxiliary wall body 32 in the insertion/removal direction rather than the terminal locking portion 34. In the housing 20, the temporary locking portion 22 and the main locking portion 23 are formed in the shape of a claw protruding from the housing body 21 along the insertion/removal direction.

At the time of assembling the spacer 30 to the housing 20, for example, by pushing the main wall body 31, the housing locked portion 35 receives a force from the temporary locking portion 22 and the other end side in the insertion/removal direction of the auxiliary wall body 32 is bent, and the bending of the auxiliary wall body 32 is released when the housing locked portion 35 climbs over the temporary locking portion 22. As a result, the spacer 30 is held by the housing 20 at the temporary locking position. In addition, by further pushing the main wall body 31 of the spacer 30, the housing locked portion 35 receives a force from the main locking portion 23 and the other end side in the insertion/removal direction of the auxiliary wall body 32 is bent, and the bending of the auxiliary wall body 32 is released when the housing locked portion 35 climbs over the main locking portion 23. As a result, the spacer 30 is held by the housing 20 at the main locking position.

In the spacer 30, the terminal locking portion 34 is provided at one end in the insertion/removal direction of the boundary portion 33 between the main wall body 31 and the auxiliary wall body 32, so that one end in the insertion/removal direction of the auxiliary wall body 32 is less likely to bend than the other end in the insertion/removal direction of the auxiliary wall body 32. In particular, in the spacer 30, since the terminal locking portion 34 extends from the fixed end adjoining the boundary portion 33 to the free end at one end in the insertion/removal direction of the auxiliary wall body 32, one end of the auxiliary wall body 32 is less likely to bend than the other end. Therefore, in the spacer 30, when the housing locked portion 35 at the other end in the insertion/removal direction of the auxiliary wall body 32 climbs over the temporary locking portion 22 and the main locking portion 23 in a series of movements while assembling the spacer 30 to the housing 20, the bending deformation amount at one end of the auxiliary wall body 32 is suppressed to be smaller than the bending deformation amount at the other end of the auxiliary wall body 32. In this way, the terminal locking portion 34 is provided to suppress a bending deformation amount of the auxiliary wall body 32 at one end in the insertion/removal direction as compared to the other end in the insertion/removal direction at which the housing locked portion 35 is located.

In the connector 1 illustrated here, the spacer 30 is provided for every two terminal-equipped electric wires 10. Therefore, the spacer 30 has two auxiliary wall bodies 32 arranged to face each other with a space therebetween. The spacer 30 includes one terminal locking portion 34 protruding from the boundary portion 33 between the main wall body 31 and one auxiliary wall body 32, the other terminal locking portion 34 protruding from the boundary portion 33 between the main wall body 31 and the other auxiliary wall body 32, one housing locked portion 35 provided on the one auxiliary wall body 32, and the other housing locked portion 35 provided on the other auxiliary wall body 32. The housing 20 includes a temporary locking portion 22 and a main locking portion 23 that lock one housing locked portion 35, and a temporary locking portion 22 and a main locking portion 23 that lock the other housing locked portion 35.

Further, the spacer 30 illustrated here includes, between one terminal locking portion 34 and the other terminal locking portion 34, a terminal locking portion (hereinafter referred to as a "central terminal locking portion") 36 which is fitted into the fitting groove 12*c* of the terminal fitting 12 of one of the two terminal-equipped electric wires 10 at the main locking position together with one terminal locking portion 34 and is fitted into the fitting groove 12*c* of the terminal fitting 12 of the other one of the two terminal-equipped electric wires 10 at the main locking position together with the other terminal locking portion 34 (FIGS. 1, 6, and 10). The central terminal locking portion 36 protrudes from the inner wall surface of the main wall body 31. The central terminal locking portion 36 has an arc-shaped wall surface 36*a* that forms a wall surface like a semi-arc together with the arc-shaped wall surface 34*a* of one terminal locking portion 34 and is disposed to face the groove bottom of the fitting groove 12*c* of the terminal fitting 12 in one terminal-equipped electric wire 10, and an arc-shaped wall surface 36*b* that forms a wall surface like a semi-arc together with the arc-shaped wall surface of the other terminal locking portion 34 and is disposed to face the groove bottom of the fitting groove 12*c* of the terminal fitting 12 in the other terminal-equipped electric wire 10 (FIGS. 1, 6, and 10). In the spacer 30, gaps are provided between the central terminal locking portion 36 and one terminal locking portion 34 and between the central terminal locking portion 36 and the other terminal locking portion 34.

Here, for example, when the terminal fitting 12 receives a force from a counterpart terminal fitting while they are connected in a fitted manner or receives a force toward the electric wire outlet 21*b* from the electric wire 11 pulled out to the outside, the force is transmitted from the side wall of the fitting groove 12*c* to the terminal locking portion 34 and the central terminal locking portion 36 at the main locking position. In the spacer 30 at the main locking position, when the main wall body 31 is bent, for example, in the gap between the terminal locking portion 34 and the central terminal locking portion 36 by the force that the terminal locking portion 34 and the central terminal locking portion 36 have received from the terminal fitting 12, the auxiliary wall body 32 may be pulled away from the housing body 21, and the locked state of the housing locked portion 35 with respect to the main locking portion 23 may be released. Therefore, the housing 20 includes a spacer holding portion 24 that maintains the locked state of the housing locked portion 35 with respect to the main locking portion 23 by locking a retainer locking portion 32*a* at one end in the insertion/removal direction of the auxiliary wall body 32 when a force for pulling away the auxiliary wall body 32 from the housing body 21 acts due to the force that the terminal locking portion 34 has received from the terminal fitting 12 in the spacer 30 at the main locking position (FIGS. 1 to 10).

The spacer holding portion 24 protrudes from the housing body 21. The spacer holding portion 24 illustrated here protrudes from the housing body 21 in an L shape, and is disposed to face an outer wall surface of the retainer locking portion 32*a* of the auxiliary wall body 32. The housing 20 has a gap G between the housing body 21 and the spacer holding portion 24, the gap G allowing one end in the insertion/removal direction of the auxiliary wall body 32 to enter from the free end to the fixed end adjoining the boundary portion 33 in the suspended direction (FIG. 1). The spacer holding portion 24 is provided for each auxiliary wall body 32. Therefore, the housing 20 includes one spacer holding portion 24 that locks the retainer locking portion 32*a* provided on one auxiliary wall body 32 and the other spacer holding portion 24 that locks the retainer locking portion 32*a* provided on the other auxiliary wall body 32. In the housing 20 illustrated here, four spacer holding portions 24 are formed.

As described above, in the connector 1 according to the present embodiment, the auxiliary wall body 32 of the spacer 30 is less likely to bend at one end in the insertion/removal direction where the terminal locking portion 34 is located than at the other end in the insertion/removal direction where the housing locked portion 35 is located. In addition, in the connector 1 according to the present embodiment, by locking the retainer locking portion 32*a* at one end in the insertion/removal direction of the auxiliary wall body 32 through the spacer holding portion 24 of the housing 20 when a force for pulling away the auxiliary wall body 32 from the housing body 21 acts due to the force that the terminal locking portion 34 has received from the terminal fitting 12 in the spacer 30 at the main locking position, the locked state of the housing locked portion 35 with respect to the main locking portion 23 is maintained. As a result, in the connector 1, even if a force for pulling away the auxiliary wall body 32 from the housing body 21 acts at the main locking position, the spacer 30 is maintained at the main locking position, so that the terminal of the electric wire 11 of the terminal-equipped electric wire 10 and the terminal fitting 12 can remain accommodated in the housing chamber 21*a* at the housing completion position. In this way, in the connector 1 according to the present embodiment, the spacer 30 can be maintained at the main locking position without increasing its rigidity, thereby making it possible to secure the terminal holding force while suppressing an increase in size.

In the connector according to the present embodiment, the auxiliary wall body of the spacer is less likely to bend at one end in the insertion/removal direction where the terminal locking portion is located than at the other end in the insertion/removal direction where the housing locked portion is located. In addition, in the connector according to the present embodiment, by locking the retainer locking portion at one end in the insertion/removal direction of the auxiliary wall body through the spacer holding portion of the housing when a force for pulling away the auxiliary wall body from the housing body acts due to the force that the terminal locking portion has received from the terminal fitting in the spacer at the main locking position, the locked state of the housing locked portion with respect to the main locking portion is maintained. As a result, in the connector, even if a force for pulling away the auxiliary wall body from the housing body acts at the main locking position, the spacer is maintained at the main locking position, so that the terminal of the electric wire of the terminal-equipped electric wire and the terminal fitting can remain accommodated in the housing chamber at the housing completion position. In this way, in the connector according to the present embodiment, the spacer can be maintained at the main locking position without increasing its rigidity, thereby making it possible to secure the terminal holding force while suppressing an increase in size.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A connector comprising:

a terminal-equipped electric wire in which a terminal fitting is physically and electrically connected to a terminal of an electric wire;

a housing that houses the terminal of the electric wire and the terminal fitting at a housing completion position in a housing chamber of a housing body, and pulls out the electric wire from an electric wire outlet of the housing body to an outside; and a spacer that enables the terminal-equipped electric wire to be inserted into and removed from the housing chamber at a temporary locking position of the housing, and holds the terminal-equipped electric wire having entered the housing completion position at a main locking position of the housing, wherein the spacer includes: a plate-shaped main wall body that is deformable in such a manner as to be bendable in a plate thickness direction, and has an inner wall surface disposed to face the housing body; a plate-shaped auxiliary wall body that is deformable in such a manner as to be bendable in a plate thickness direction, is suspended from the main wall body, has an inner wall surface disposed to face the housing body, and forms a boundary portion with the main wall body along an insertion/removal direction of the terminal-equipped electric wire; a terminal locking portion that protrudes from the inner wall surface of each of the main wall body and the auxiliary wall body at one end of the boundary portion in the insertion/removal direction, and locks a movement of the terminal fitting toward the electric wire outlet at the main locking position to hold the terminal-equipped electric wire at the housing completion position; and a housing locked portion that protrudes from the other end side of the inner wall surface of the auxiliary wall body in the insertion/removal direction rather than the terminal locking portion, is locked to a temporary locking portion of the housing at the temporary locking position, and is locked to a main locking portion of the housing at the main locking position, and the housing includes a spacer holding portion that maintains the locked state of the housing locked portion with respect to the main locking portion by locking a retainer locking portion at one end of the auxiliary wall body in the insertion/removal direction, when a force for pulling away the auxiliary wall body from the housing body acts due to a force that the terminal locking portion has received from the terminal fitting in the spacer at the main locking position.

2. The connector according to claim 1, wherein the spacer holding portion protrudes from the housing body, and the housing has a gap between the housing body and the spacer holding portion, the gap allowing the one end of the auxiliary wall body in the insertion/removal direction to enter from a free end to a fixed end adjoining the boundary portion in a suspended direction.

3. The connector according to claim 1, wherein the spacer includes: two auxiliary wall bodies arranged to face each other with a space therebetween; one terminal locking portion protruding from a boundary portion between the main wall body and one of the auxiliary wall bodies; the other terminal locking portion protruding from a boundary portion between the main wall body and the other one of the auxiliary wall bodies; one housing locked portion provided on the one auxiliary wall body; and the other housing locked portion provided on the other auxiliary wall body, and the housing includes: a temporary locking portion and a main locking portion that lock the one housing locked portion; a temporary locking portion and a main locking portion that lock the other housing locked portion; one spacer holding portion that locks a retainer locking portion provided on the one auxiliary wall body; and the other spacer holding portion that locks a retainer locking portion provided on the other auxiliary wall body.

4. The connector according to claim 1, wherein the terminal locking portion is provided to suppress a bending deformation amount of the auxiliary wall body at the one end in the insertion/removal direction as compared to the other end in the insertion/removal direction at which the housing locked portion is located.

5. The connector according to claim 2, wherein the terminal locking portion is provided to suppress a bending deformation amount of the auxiliary wall body at the one end in the insertion/removal direction as compared to the other end in the insertion/removal direction at which the housing locked portion is located.

6. The connector according to claim 3, wherein the terminal locking portion is provided to suppress a bending deformation amount of the auxiliary wall body at the one end in the insertion/removal direction as compared to the other end in the insertion/removal direction at which the housing locked portion is located.

* * * * *